(12) United States Patent
Mottupalli et al.

(10) Patent No.: US 9,684,684 B2
(45) Date of Patent: Jun. 20, 2017

(54) INDEX UPDATES USING PARALLEL AND HYBRID EXECUTION

(71) Applicants: Srinivasan Mottupalli, Bangalore (IN); Xiaobin Ma, Fremont, CA (US); Peter Schneider, Las Vegas, NV (US)

(72) Inventors: Srinivasan Mottupalli, Bangalore (IN); Xiaobin Ma, Fremont, CA (US); Peter Schneider, Las Vegas, NV (US)

(73) Assignee: SYBASE, INC., Dublin, CA (US)

( * ) Notice: Subject to any disclaimer, the term of this patent is extended or adjusted under 35 U.S.C. 154(b) by 394 days.

(21) Appl. No.: 14/326,157

(22) Filed: Jul. 8, 2014

(65) Prior Publication Data

US 2016/0012083 A1    Jan. 14, 2016

(51) Int. Cl.
*G06F 17/30* (2006.01)

(52) U.S. Cl.
CPC .... *G06F 17/30321* (2013.01); *G06F 17/3038* (2013.01)

(58) Field of Classification Search
CPC .................. G06F 17/30321; G06F 17/3038
See application file for complete search history.

(56) References Cited

U.S. PATENT DOCUMENTS

| | | | |
|---|---|---|---|
| 5,649,181 A | 7/1997 | French et al. | |
| 5,918,225 A | 6/1999 | White et al. | |
| 6,438,562 B1 * | 8/2002 | Gupta | G06F 17/30336 707/696 |
| 6,480,839 B1 * | 11/2002 | Whittington | G06F 17/30327 |
| 7,743,060 B2 | 6/2010 | Fontoura et al. | |
| 7,769,732 B2 | 8/2010 | Cox et al. | |
| 8,032,503 B2 | 10/2011 | Bouloy et al. | |
| 8,108,659 B1 | 1/2012 | Le Grand | |
| 8,200,673 B2 | 6/2012 | Hanson et al. | |
| 8,370,316 B2 | 2/2013 | Bensberg et al. | |
| 8,489,565 B2 | 7/2013 | Balasubramanian et al. | |
| 8,515,945 B2 | 8/2013 | Pendap | |
| 8,515,963 B1 * | 8/2013 | Blank, Jr. | G06F 17/30864 707/741 |
| 8,682,925 B1 * | 3/2014 | Marquardt | G06F 17/30477 707/722 |
| 8,738,425 B1 * | 5/2014 | Basu | G06Q 10/06393 705/7.38 |
| 9,600,517 B2 * | 3/2017 | Ma | G06F 17/3038 |
| 2003/0004945 A1 * | 1/2003 | Teng | G06F 17/30362 |
| 2003/0105732 A1 * | 6/2003 | Kagalwala | G06F 17/30292 |
| 2006/0218123 A1 | 9/2006 | Chowdhuri | |
| 2007/0214167 A1 * | 9/2007 | Nair | G06F 17/30377 |
| 2008/0126311 A1 | 5/2008 | Rowley | |
| 2008/0294597 A1 * | 11/2008 | Bourdoncle | G06F 17/30631 |
| 2009/0094236 A1 * | 4/2009 | Renkes | G06F 17/30336 |

(Continued)

*Primary Examiner* — Noosha Arjomandi
(74) *Attorney, Agent, or Firm* — Schwegman Lundberg & Woessner PA

(57) ABSTRACT

A method can include receiving a request to execute a database command identifying a target table; identifying a plurality of rows to insert into the target table based in part on the database command; writing rows, from the plurality of rows, into a data page until the data page is full; determining, by an index thread manager, a number of threads to use for updating indexes defined for the target table; and upon determining the data page is full, updating, in parallel, the indexes defined for the target table using the number of threads.

17 Claims, 5 Drawing Sheets

(56) References Cited

U.S. PATENT DOCUMENTS

| | | | |
|---|---|---|---|
| 2009/0193406 A1* | 7/2009 | Williams | G06F 17/30011 717/168 |
| 2009/0240664 A1* | 9/2009 | Dinker | G06F 12/0842 |
| 2009/0240711 A1* | 9/2009 | Levin | G06F 17/30312 |
| 2009/0319550 A1* | 12/2009 | Shau | G06F 17/30595 |
| 2010/0235338 A1* | 9/2010 | Gabriel | G06F 17/30864 707/706 |
| 2010/0250504 A1* | 9/2010 | Balasubramanian | G06F 17/30306 707/696 |
| 2010/0293209 A1* | 11/2010 | Bireley | G06F 17/30418 707/718 |
| 2010/0306238 A1* | 12/2010 | Balakrishnan | G06F 17/30631 707/769 |
| 2012/0143873 A1* | 6/2012 | Saadat | G06F 17/30584 707/741 |
| 2012/0197868 A1 | 8/2012 | Fauser et al. | |
| 2012/0240000 A1* | 9/2012 | Venkataraj | H04L 1/1657 714/751 |
| 2012/0265726 A1* | 10/2012 | Padmanabhan | G06F 17/303 707/602 |
| 2013/0097127 A1* | 4/2013 | Mohapatra | G06F 17/30153 707/693 |
| 2013/0262519 A1* | 10/2013 | Diner | G06F 17/30563 707/802 |
| 2014/0095505 A1* | 4/2014 | Blanchflower | G06F 17/30091 707/737 |
| 2014/0222872 A1* | 8/2014 | Rambo | G06F 17/30345 707/803 |
| 2015/0081719 A1* | 3/2015 | Ray | G06F 17/30551 707/743 |
| 2015/0212999 A1* | 7/2015 | Alvey | G06F 17/245 715/227 |
| 2015/0309846 A1* | 10/2015 | Prasad | G06F 9/38 345/522 |
| 2015/0347409 A1* | 12/2015 | Ma | G06F 17/3038 707/808 |
| 2015/0347470 A1* | 12/2015 | Ma | G06F 17/30374 707/803 |
| 2015/0356009 A1* | 12/2015 | Wheeler | G06F 12/0638 711/170 |
| 2016/0132194 A1* | 5/2016 | Grue | G06F 3/0482 715/810 |
| 2016/0132538 A1* | 5/2016 | Bliss | G05B 19/41855 707/741 |
| 2016/0132595 A1* | 5/2016 | Bliss | G06F 17/30864 707/706 |

* cited by examiner

INDEX UPDATES USING PARALLEL AND HYBRID EXECUTION

TECHNICAL FIELD

Embodiments described herein generally relate to index updates and in particular, but not limited to, index updates using parallel and hybrid execution.

BACKGROUND

Various types of databases are used to store and retrieve data. For example, a relational database is organized as tables with each table capable of having zero or more rows of data. One or more columns in a table can be designated as a primary key (e.g., a unique value for the row). The data in one table can have a relation to another table by relating a column in one table to one of the primary key columns in a second table. Each table can also have one or more associated indexes.

A database index is a subset of a table, such as the primary key, that can be used to search for the existence of a row rather than searching the entire table. At the storage device level, pages are used to store data of a database. For example, rows of a database are stored as data pages of fixed size (e.g., each table can have multiple data pages) whereas indexes can be stored as index pages. Groups of pages are called extents.

A relational database management system (RDBMS) can include software that can be used to manage a relational database. Typically, Structured Query Language (SQL) is the programming language that is used to create, read, update, and delete (CRUD) data stored in the tables of a database. An SQL command can be considered a query.

One common task in data warehouse environments using relational databases is large-scale loading and merging of data across tables. The data can be loaded in the data warehouse through SQL queries such as INSERT INTO . . . SELECT or MERGE INTO statements. In various examples, while loading the data, the indexes defined on the target table of these SQL statements should be updated at the same time in order to maintain the data integrity and keep the indexes useful in subsequent queries. However, existing approaches insert the rows one-by-one and update the indexes for each row in a non-BULK insert mode (e.g., the indexes are updated serially). For large data loading, using serial inserts and serial index updates can be an inefficient approach.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not limitation, in the figures of the accompanying drawings in which.

DETAILED DESCRIPTION

For large data loading, using serial inserts via a traditional non-BULK insert can be an inefficient approach. For example, the insertion into data pages and update of the indexes are separate operations in a non-BULK insert. Once the newly inserted row is available, the threads can proceed in parallel in separate threads, but it is still inefficient if each thread handles one row at a time. One inefficiency can occur after an index update thread finishes its own work, because the thread has to wait for the main thread to read a row from the underlying table and prepare the row for the thread. For example, in a non-BULK insert mode, each row is copied into a fixed buffer of one row size and then inserted into a data page for the target table. After the row is inserted, the RDBMS scans all indexes and updates the indexes one-by-one with the newly inserted rows in a serial mode. This process is repeated until all the rows are inserted into data pages and all indexes are updated.

In order to address some of the inefficiencies above, a BULK insert mode can be used where rows from a base table (e.g., the table that rows are copied from) are built into a data page for the target table. As the rows are built into the data page, the page fills up and the page is handed off directly to a database store layer and written to disk. While writing the whole data page to disk, parallel index update threads take the data page and update the corresponding indexes in parallel.

Figure 1:
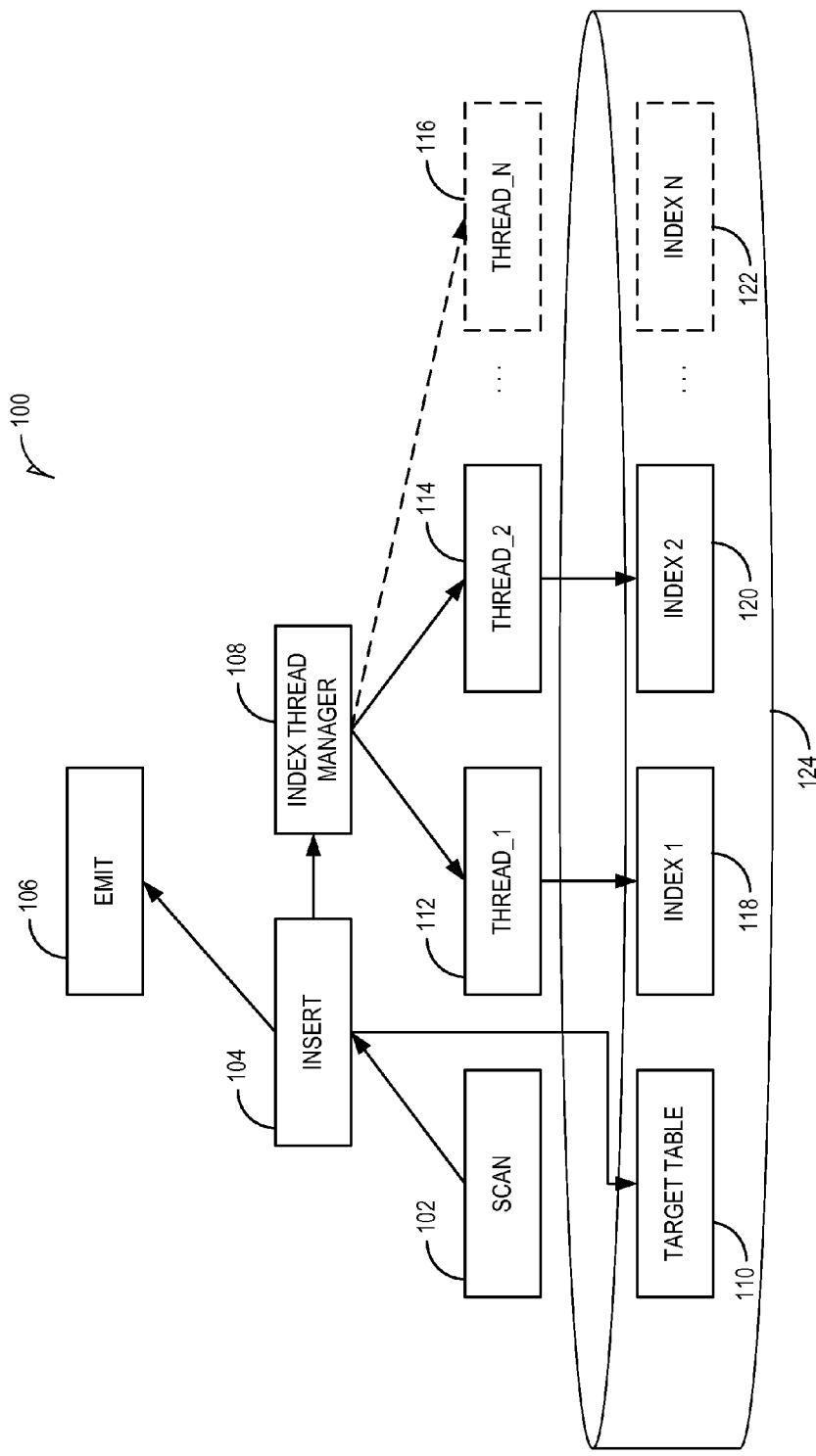
FIG. 1 is a visualization of updating a plurality of indexes in parallel, according to an example embodiment.

FIG. 1 is a visualization 100 of updating a plurality of indexes in parallel, according to an example embodiment. Visualization 100 includes a scan operation 102, an insert operation 104, an emit operation 106, an index thread manager 108, a target table 110, a thread_1 112, a thread_2 114, a thread_N 116, an index_1 118, an index_2 120, an index_N 122, and a database 124, according to an example embodiment.

In various examples, the scan operation 102 is performed in response to a database command being executed. For example, a user can log in to a database system and input a command via a command line or graphical user interface (GUI). In an example, the command can be initiated via an automated process (e.g., application code running on a website including a form to insert data). The command can be, for example, an INSERT command for inserting data from a base table in the database 124 to the target table 110. The INSERT command can specify both the base table and target table. For example, the following example command will be discussed in the context of the visualization 100:

INSERT INTO t1 SELECT*FROM t3.

This command indicates that all rows from table "t3" are to be inserted into table "t1." Within the visualization 100, target table 110 can be considered table "t3." Other types of database commands can also be used, but are not limited to:

SELECT INTO,

Batch insert

MERGE . . . INTO statements

During execution of the command, the scan operation 102 can determine what rows need to be copied to the target table 110. For example, in the case of the example command above, the scan operation 102 can retrieve all rows from table "t3" because the command indicates all rows from this table are to be inserted into the target table 110. In various examples, the scan operation 102 passes data identifying the rows to the insert operation 104.

In various examples, the insert operation 104 can take the identified rows and insert them into the target table 110 stored in the database 124. For example, when using a BULK insert mode, the insert operation 104 can buffer a data page of rows identified in the scan operation 102, and when the data page is full, write the data page to disk for the target table 110. More details of how rows are inserted into a target table are discussed with respect to FIG. 3. In various examples, when a data page is full and being written to disk, an identifier of the data page is passed to the index thread manager 108.

Figure 4:
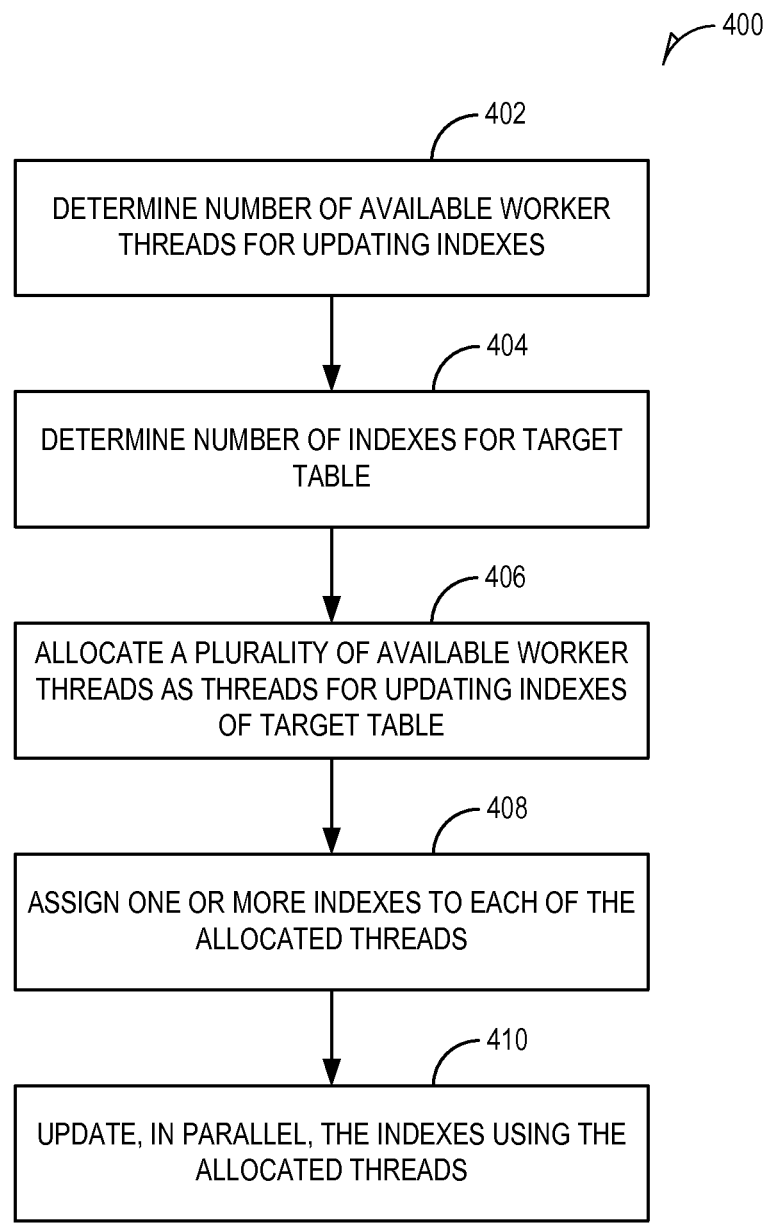
FIG. 4 is a flow chart illustrating a method, in accordance with an example embodiment, to allocate threads to update indexes in parallel.

In various examples, the index thread manager 108 is responsible for allocating threads to update indexes of the target table 110. For example, consider that the target table 110 has two defined indexes: index_1 118 and index_2 120. The index thread manager 108 can assign the thread_1 112 to update the index_1 118 and the thread_2 114 to update the index_2 120. As illustrated by the thread_N 116 and index_N 122, there can be additional indexes and therefore additional threads assigned to update the additional indexes. Further details of how threads are allocated for index updates are illustrated in FIG. 4, according to an example embodiment.

In various examples, the emit operation 106 transmits data back to a GUI of the user. The data can indicate the success or failure of the command as well as statistics associated with the commands For example, the data can indicate that 250 rows were successfully inserted from table "t3" into table "t1."

Figure 2:
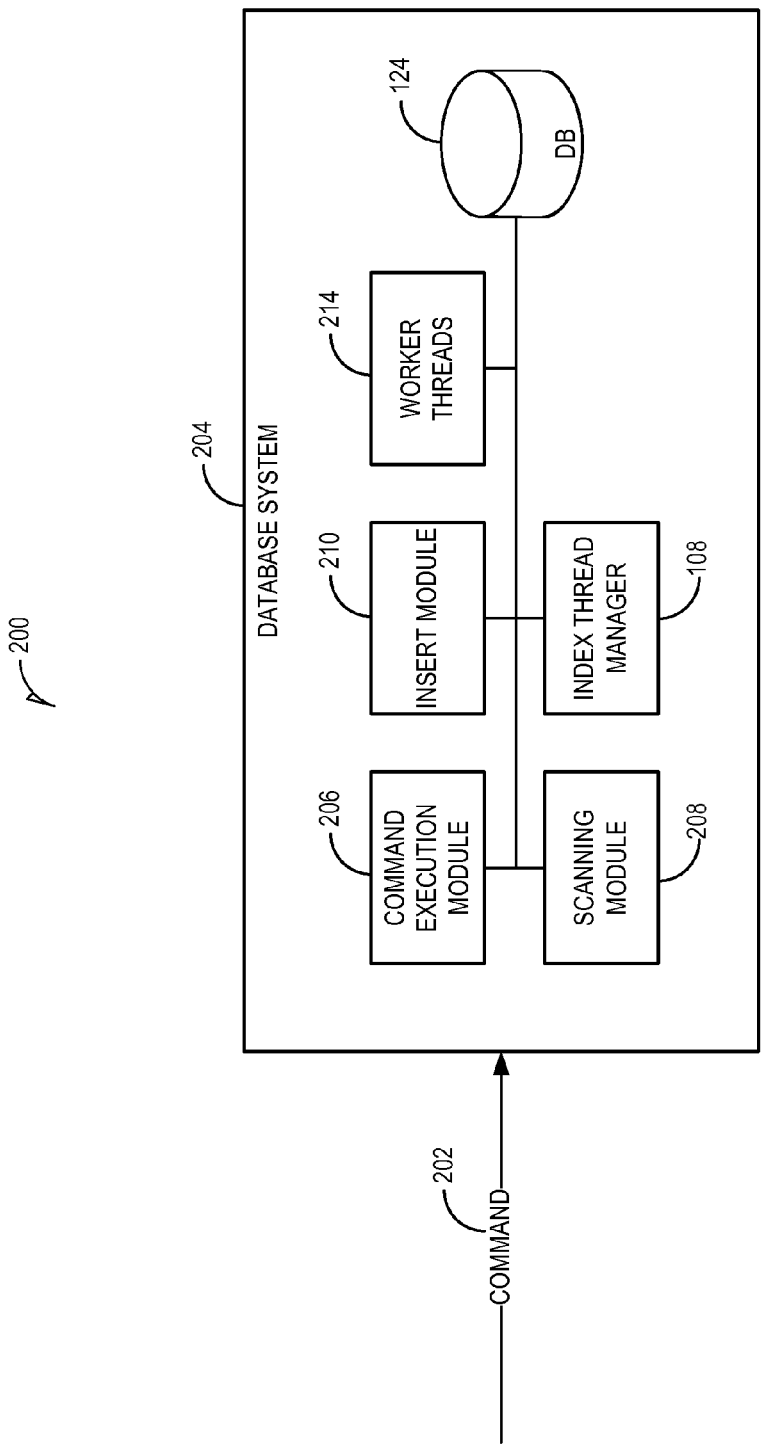
FIG. 2 illustrates system components used to update indexes in parallel, according to an example embodiment.

FIG. 2 illustrates system 200 including components used to update indexes in parallel, according to an example embodiment. System 200 includes a command 202 and a database system 204, which in turn includes a command execution module 206, a scanning module 208, an insert module 210, the index thread manager 108, worker threads 214, and the database 124.

In an example, the database system 204 is a RDBMS. The database system 204 can include one or more computing devices (e.g., hardware storage devices, processing units) to host and run the components and modules illustrated in the database system 204. The database 124 can be hosted by one or more servers (e.g., a network connected computing device including one or more processors). In an example, the components and modules of the database system 204 can be combined into one or more modules. Similarly, the functionality of the modules and components can be split out into additional components or modules. Further, the components and modules can be hosted and executed on a distributed computing platform and therefore do not need to be physically located and executed in the same location. The functionality of the components and modules of the database system 204 is discussed below in the context of FIGS. 3 and 4.

Figure 3:
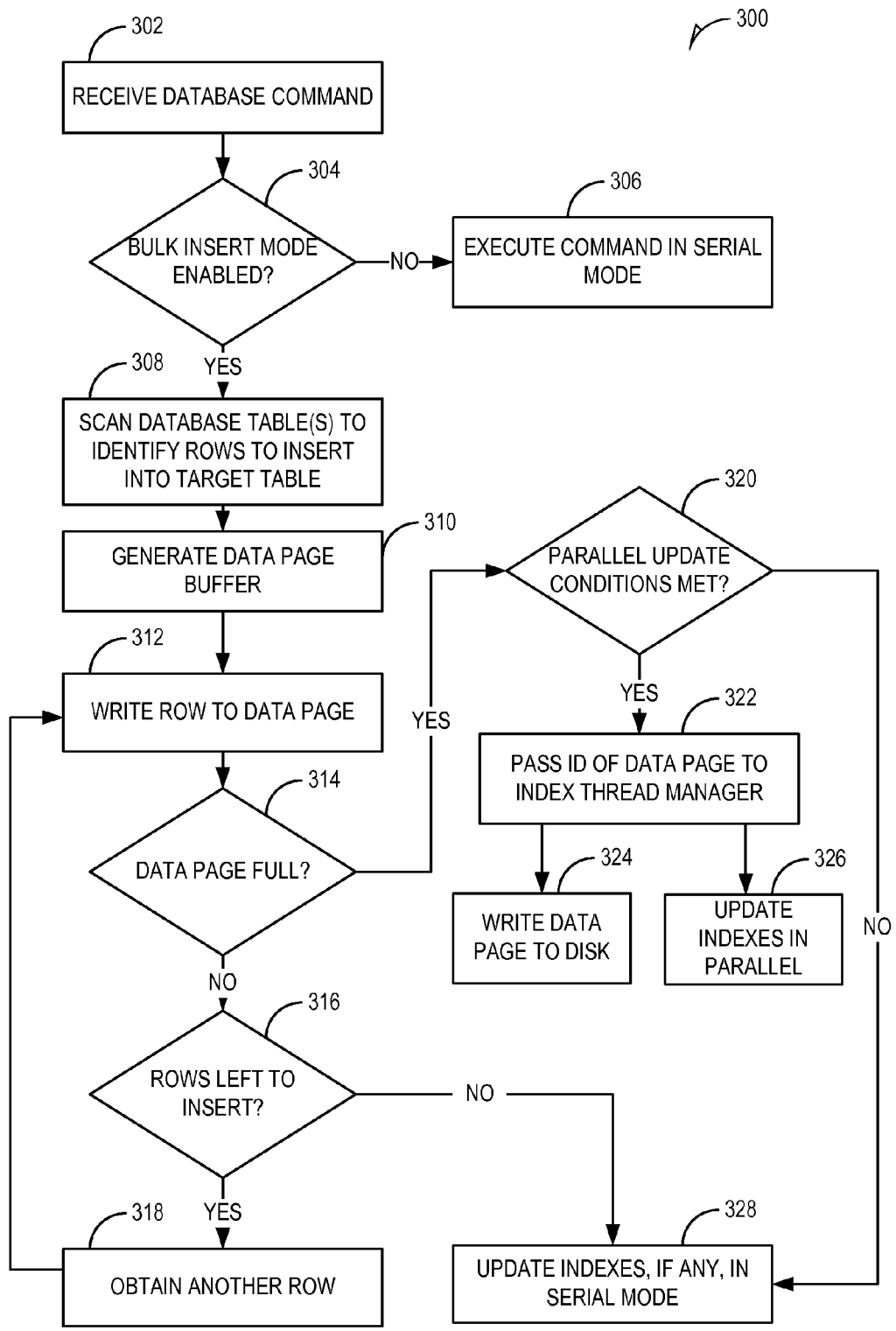
FIG. 3 is a flow chart illustrating a method, in accordance with an example embodiment, to execute a database command, according to an example embodiment.

FIG. 3 is a flow chart illustrating a method 300, in accordance with an example embodiment, to execute a database command. The method 300 can be performed by processing logic that can comprise hardware (e.g., circuitry, dedicated logic, programmable logic, microcode, hardware modules etc.), software (e.g., instructions run on a processing device, software modules), or a combination thereof.

In an example, at operation 302, a request to execute a database command is received. For example, the command can be the command 202 in FIG. 2. The command can be received at the database system 204 and initially processed by the command execution module 206. In an example, the command 202 identifies a target table and include an SQL statement, which when evaluated, results in one or more rows to insert into the target table.

In an example, at decision 304, it is determined whether or not a bulk insert mode is enabled for the command 202. The bulk insert mode can be set at a number of levels within the database system 204. For example, the bulk mode can be set at the server level (e.g., as a system-wide setting), at a session level (e.g., for a user SQL session), specific to a procedure, or a query level setting. In various examples, the bulk-insert mode is not initially enabled but is enabled based on a run-time decision during execution of the command 202. In an example, the command execution module 206 determines if the current mode is the bulk insert mode. If it is determined at decision 304 that the bulk insert mode is not enabled, flow continues to operation 306.

At operation 306, in an example embodiment, the command 202 is executed in a serial mode. For example, in a serial mode, rows are inserted one-by-one into the target table and the indexes defined for the target table are updated, serially, after each row is inserted into the target table.

In various examples if, at decision 304, it is determined that the bulk insert mode has been enabled, database table(s) are scanned to identify rows to insert into the target table (operation 308. For example, the scanning module 208 can be configured to identify a plurality of rows to insert into the target table based in part on the database command (e.g., the database command can be evaluated).

In various examples, at operation 310, a data page can be generated in a buffer. For example, the data page can be generated in short-term memory such as random access memory (RAM). The data page can be the same size as a page of the target table. In an example, the data page can include an identifier (e.g., alphanumeric, page identifier) used to identify the data page in RAM. The identifier can be the memory location of the data page in RAM, in an example embodiment.

In an example, a row is written to the data page (operation 312). For example, the insert module 210 can be configured to write rows into the data page until the data page is full (decision 314). In an example, the rows written into the data page are the rows identified by the scanning module 208.

If it is determined that the data page is not full, then it is determined if there are any identified rows that have yet to be inserted into a data page (decision 316). When it is determined that there are no more rows left to be inserted into a data page and the data page is not full, then at operation 328, indexes defined for the target table can be updated in a serial mode.

In various examples, if it is determined that rows remain to be inserted into a data page (decision 316), another row can be obtained from the rows identified by the scanning module 208 (operation 318) and written to the data page. Then, when the data page is full (decision 314), the flow continues to decision 320 to determine if the conditions for using parallel index updates have been met. If the conditions for updating indexes in parallel have not been met, flow can continue to operation 328 to update any indexes in a serial mode.

For example, there can be restrictions on when parallel index updates can be used. In various examples, the restrictions can be preferences set at the server level, and thus, the restrictions do not always need to apply. For example, parallel index updates can be disallowed when only one index exists for a target table or when no threads are available for parallel updating.

In various examples, when it is determined that the conditions for using parallel index updates have been met, flow continues to operation 322 where the identifier of the data page is passed to the index thread manager 108. In an example, the index thread manager 108 is configured to determine a plurality of threads to use for updating indexes defined for the target table. At operation 326, the defined indexes can be updated in parallel. Further detail of this operation is discussed with respect to the FIG. 4. In an example, concurrent (e.g., started at the same time) with the index updates, the data page can be written to disk (e.g., more permanent storage such as a hard disk) at operation 324. In various example, when there are multiple data pages involved in executing the database command, multiple data pages can be written to the disk at the same time in order to maintain data consistency during execution of the command.

In various examples, FIG. 4 is a flow chart illustrating a method 400 to allocate threads to update indexes in parallel, according to an example embodiment. The method 400 can be performed by processing logic that can comprise hardware (e.g., circuitry, dedicated logic, programmable logic, microcode, hardware modules etc.), software (e.g., instructions run on a processing device, software modules), or a combination thereof.

In an example, at operation 402, the number of available worker threads for updating indexes is determined In an example, a worker thread (e.g., a worker thread of worker threads 214) can be configured to execute portions of the command 202. In various examples, a worker thread can be used to write a row to a data page, write the data page to a hard disk, update an index, scan a table to determine rows that need to be copied to a target table, and so forth.

The number of available worker threads for updating indexes can be affected by a number of factors. For example, the database system 204 can have a maximum number of threads that are available as configured (e.g., 100) for executing all commands received at the database system 204. The total number of threads can be a preference stored in a configuration file for the database system 204. The configuration file can also specify a maximum number of total threads that are to be used for a single command as well as the number of threads that can be used for updating indexes. Accordingly, depending on the current load on the database system 204, there can be more or fewer threads available for updating indexes. In an example, the index thread manager 108 queries the database system 204 to determine the number of available worker threads for updating indexes.

In an example, at operation 404, the number of indexes defined for the target table is determined A table of a database can have one or more indexes that allow for quicker searching of the entire table. For example, if a table has ten columns relating to a contact (e.g., identifier (ID), first name, last name, address, occupation, etc.), an index can be defined on just the ID or just the first name. In an example, the index thread manager 108 can query the database system 204 to determine the number of indexes defined for the target table.

The index thread manager 108 can allocate (e.g., task or designate) a plurality of the available worker threads as threads for updating indexes of the target table (operation 406). In some instances, the number of allocated threads is limited by the configuration file indicating the number of total threads for parallel index updates.

When the number of available worker threads for updating indexes is less than or equal to the number of defined indexes, the index thread manager 108 can allocate the same number of worker threads as the number of defined indexes. In other words, if there are five available worker threads and five defined indexes, the index thread manager 108 can allocate five worker threads as threads for updating indexes. If there are more defined indexes than available worker threads, the index thread manager 108 can allocate all the available worker threads, subject to restrictions in the configuration of the database system 204, as threads for updating indexes. In some examples, the index thread manager 108 can allocate fewer than the number of available worker threads as threads for updating indexes.

In various examples, the index thread manager 108 can assign one or more defined indexes to the allocated threads (operation 408). For example, if there is one allocated thread for every defined index, the index thread manager 108 can assign one index of the target table to one thread. In other words, if there are five defined indexes and five allocated threads, each respective allocated thread can be assigned a respective index of the target table such that each of the allocated threads is paired with a different defined index, as shown in the table below:

| Thread 1 | Index 1 |
| Thread 2 | Index 2 |
| Thread 3 | Index 3 |
| Thread 4 | Index 4 |
| Thread 5 | Index 5 |

In an example, if there are more defined indexes for the target table than allocated threads, one or more indexes can be assigned to each of the allocated threads. For example, if there are seven indexes and five threads, two threads can have two indexes assigned as illustrated below:

| Thread 1 | Indexes 1, 6 |
| Thread 2 | Indexes 2, 7 |
| Thread 3 | Index 3 |
| Thread 4 | Index 4 |
| Thread 5 | Index 5 |

The distribution of assigned indexes is not limited to an even distribution. For example, if there are eight indexes and four allocated threads, three indexes can be assigned to the first thread, three to the second thread, and one index to each of the remaining threads.

In an example, if there is a partitioned index, all sub-index trees of that partitioned index can be updated as needed by just one thread. For example, if the target table has two global indexes and three partitioned indexes, there could be a total of five worker threads, with each assigned to a different index. In an example, the method of index updates can be extended to distribute the sub-index trees of a partitioned index into multiple threads to apply them in parallel.

In various examples the allocated threads then update their respective assigned indexes in parallel (operation 410). Because a single thread can have more than one index to update, not all indexes are necessarily updated in parallel, but rather the threads can operate in parallel with respect to each other.

In various examples, while the indexes are being updated for a first data page, rows, as determined previously by the scanning module 208, can be written to a second data page.

When the second data page is complete, the identifier of the second data page can be passed to the index thread manager 108. The index thread manager 108 can, in turn, pass the identifier down to the allocated threads to update the indexes defined for the target table with respect to the rows in the second data page. An example timeline of this process follows from Time T1 to Tn+1:

| Time | Scan | Index Thread Manager |
| --- | --- | --- |
| T1 | Read & build $1^{st}$ page | Idle, Waiting |
| T2 | Pass $1^{st}$ page identifier to index thread manager<br>Read & build $2^{nd}$ page | Write index entries of $1^{st}$ page |
| ... | ... | ... |
| Tn | Pass (n-1)'th page<br>Read & Build n'th page | Write index entries of (n-1)'th page where n is the last page |
| Tn + 1 | Idle, no more rows | Write indexes for nth page. |

In an example, the index thread manager 108 does not allocate and assign indexes to the threads after the first data page allocation and assignment process. Instead, the threads are allocated and assigned for the duration of the execution of the database command. In another example embodiment, the index thread manager 108 allocates worker threads for updating indexes and assigns indexes to the threads after each data page is full.

Example Computer System

Embodiments can be implemented in one or a combination of hardware, firmware, and software. Embodiments can also be implemented as instructions stored on a machine-readable storage device, which can be read and executed by at least one processor to perform the operations described herein. A machine-readable storage device can include any non-transitory mechanism for storing information in a form readable by a machine (e.g., a computer). For example, a machine-readable storage device can include read-only memory (ROM), RAM, magnetic disk storage media, optical storage media, flash-memory devices, and other storage devices and media.

Examples, as described herein, can include, or can operate on, logic or a number of components, modules, or mechanisms. Modules can be hardware, software, or firmware communicatively coupled to one or more processors in order to carry out the operations described herein. Modules can hardware modules, and as such modules can be considered tangible entities capable of performing specified operations and can be configured or arranged in a certain manner. In an example embodiment, circuits can be arranged (e.g., internally or with respect to external entities such as other circuits) in a specified manner as a module. In an example embodiment, the whole or part of one or more computer systems (e.g., a standalone, client or server computer system) or one or more hardware processors can be configured by firmware or software (e.g., instructions, an application portion, or an application) as a module that operates to perform specified operations. In an example embodiment, the software can reside on a machine-readable medium. In an example embodiment, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor can be configured as respective different modules at different times. Software can accordingly configure a hardware processor, for example, to constitute a particular module at one instance of time and to constitute a different module at a different instance of time. Modules can also be software or firmware modules, which operate to perform the methodologies described herein.

Figure 5:
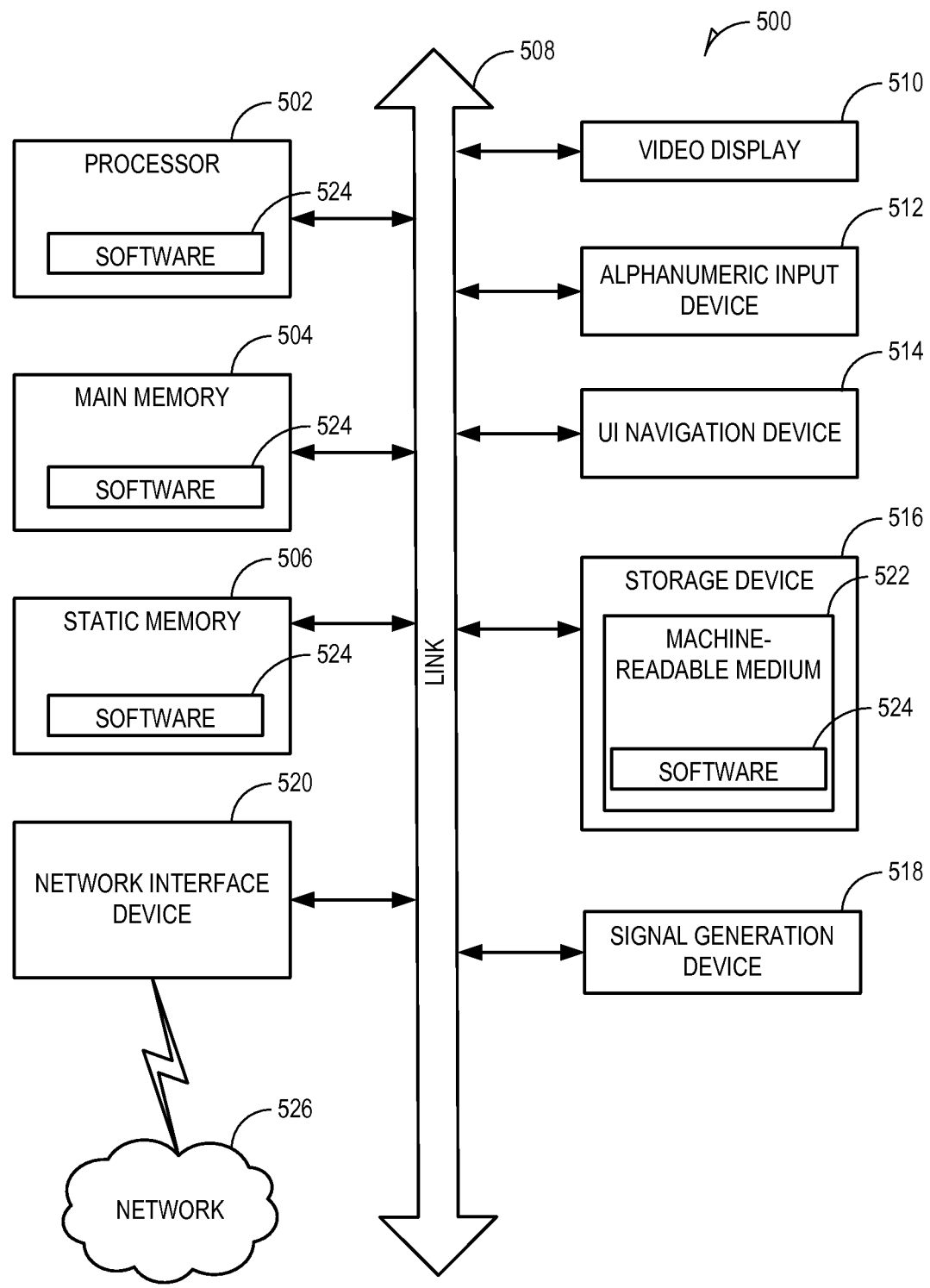
FIG. 5 is a block diagram illustrating a machine in the example form of a computer system, within which a set or sequence of instructions can be executed to cause the machine to perform any one of the methodologies discussed herein, according to an example embodiment.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes at least one processor 502 (e.g., a central processing unit (CPU), a graphics processing unit (GPU), or both, processor cores, computer nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512, and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., Hypertext Transfer Protocol (HTTP)). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description.

The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features can be grouped together to streamline the disclosure. However, the claims may not set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. Additionally, while the claims may recite "first row," "second row," and so forth, this is not intended to limit the scope to a literal ordering, but rather distinguishing between objects. The scope of the embodiments disclosed herein is to be determined with reference to the appended claims, along with the full scope of equivalents to which such claims are entitled.

What is claimed is:

1. A method comprising:
receiving a request to execute a database command identifying a target table;
identifying a plurality of rows to insert into the target table based in part on the database command;
writing rows, from the plurality of rows, into a data page until the data page is full;
determining, by an index thread manager, a number of threads to use for updating indexes defined for the target table by:
determining a number of available threads for updating the indexes defined for the target table;
allocating a number of the available threads for updating the indexes defined for the target table, wherein the number of the allocated threads is less than the number of indexes defined for the target table when the number of available threads is less than the number of indexes defined for the target table; and
for each particular respective thread of the allocated threads, assigning, by the index thread manager, one or more indexes of the indexes defined for the target table; and
upon determining the data page is full, updating, in parallel, the indexes defined for the target table using the number of threads.

2. The method of claim 1, further comprising:
accessing a configuration file to determine a maximum number of threads to use for a single database command; and
limiting the number of allocated threads to the maximum number of threads to use for a single database command.

3. The method of claim 1, further comprising:
passing an identifier of the data page to the index thread manager; and
passing the identifier of the data page from the index thread manager to a thread of the allocated threads, the thread using the identifier to access the rows in the data page to update the one or more indexes assigned to the thread.

4. The method of claim 1, further comprising, writing a second of set of the plurality of rows into a second data page concurrently with the indexes defined for the target table being updated.

5. The method of claim 1, further comprising:
determining that the plurality of rows are inserted into the target table using a bulk insert mode before updating the indexes using the number of threads.

6. A system comprising:
at least one processor; and
a storage device with instructions stored thereon, which when executed by the least one processor implement:
a command execution module configured to receive a request to execute a database command identifying a target table;
a scanning module configured to identify a plurality of rows to insert into the target table based in part on the database command;
an insert module configured to write rows, from the plurality of rows, into a data page until the data page is full;
an index thread manager configured to determine a number of threads to use for updating indexes defined for the target table by:
determining a number of available threads for updating the indexes defined for the target table;
allocating a number of the available threads for updating the indexes defined for the target table, wherein the number of the allocated threads is less than the number of indexes defined for the target table when the number of available threads is less than the number of indexes defined for the target table; and
for each particular respective thread of the allocated threads, assigning, by the index thread manager, one or more indexes of the indexes defined for the target table; and wherein the number of threads update, in parallel, the indexes defined for the target table when the data page is full.

7. The system of claim 6, wherein the index thread manager is further configured to:
   access a configuration file to determine a maximum number of threads to use for a single database command; and
   limit the number of allocated threads to the maximum number of threads to use for a single database command.

8. The system of claim 6, wherein the index thread manager is further configured to:
   receive an identifier of the data page; and
   pass the identifier of the data page from the index thread manager to a thread of the allocated threads, the thread using the identifier to access the rows in the data page to update the one or more indexes assigned to the thread.

9. The system of claim 6, wherein the insert module is configured to write a second of set of the plurality of rows into a second data page concurrently with the indexes defined for the target table being updated.

10. The system of claim 6, wherein the command execution module is configured to determine that the plurality of rows are inserted into the target table using a bulk insert mode before the indexes are updated using the number of threads.

11. A non-transitory computer-readable medium comprising instructions, which when executed by one or more processors, configure the one or more processors to perform operations comprising:
   receiving a request to execute a database command identifying a target table;
   identifying a plurality of rows to insert into the target table based in part on the database command;
   writing rows, from the plurality of rows, into a data page until the data page is full;
   determining, by an index thread manager, a number of threads to use for updating indexes defined for the target table by:
      determining a number of available threads for updating the indexes defined for the target table;
      allocating a number of the available threads for updating the indexes defined for the target table, wherein the number of the allocated threads is less than the number of indexes defined for the target table when the number of available threads is less than the number of indexes defined for the target table; and
      for each particular respective thread of the allocated threads, assigning, by the index thread manager, one or more indexes of the indexes defined for the target table; and
   upon determining the data page is full, updating, in parallel, the indexes defined for the target table using the number of threads.

12. The non-transitory computer-readable medium of claim 11, wherein the instructions configure the one or more processors to perform operations comprising:
   accessing a configuration file to determine a maximum number of threads to use for a single database command; and
   limiting the number of allocated threads to the maximum number of threads to use for a single database command.

13. The non-transitory computer-readable medium of claim 11, wherein the instructions configure the one or more processors to perform operations comprising:
   passing an identifier of the data page to the index thread manager; and
   passing the identifier of the data page from the index thread manager to a thread of the allocated threads, the thread using the identifier to access the rows in the data page to update the one or more indexes assigned to the thread.

14. The non-transitory computer-readable medium of claim 11, wherein the instructions configure the one or more processors to perform operations comprising:
   writing a second of set of the plurality of rows into a second data page concurrently with the indexes defined for the target table being updated.

15. A method comprising:
   receiving a request to execute a database command identifying a target table;
   identifying a plurality of rows to insert into the target table based in part on the database command;
   writing rows, from the plurality of rows, into a data page until the data page is full;
   determining, by an index thread manager, a number of threads to use for updating indexes defined for the target table by:
      determining a number of available threads for updating the indexes defined for the target table;
      allocating a number of the available threads as threads for updating the indexes defined for the target table, wherein the number of the allocated threads is equal to the number of indexes defined for the target table when the number of available threads is equal to or greater than the number of indexes defined for the target table; and
      for each particular respective thread of the allocated threads, assigning, by the index thread manager, a respective index of the indexes defined for the target table; and
   upon determining the data page is full, updating, in parallel, the indexes defined for the target table using the number of threads.

16. A system comprising:
   at least one processor; and
   a storage device with instructions stored thereon, which when executed by the least one processor implement:
      a command execution module configured to receive a request to execute a database command identifying a target table;
      a scanning module configured to identify a plurality of rows to insert into the target table based in part on the database command;
      an insert module configured to write rows, from the plurality of rows, into a data page until the data page is full;
      an index thread manager configured to determine a number of threads to use for updating indexes defined for the target table by:
         determining a number of available threads for updating the indexes defined for the target table;
         allocating a number of the available threads as threads for updating the indexes defined for the target table, wherein the number of the allocated threads is equal to the number of indexes defined for the target table when the number of available threads is equal to or greater than the number of indexes defined for the target table; and for each particular respective thread of the allocated threads, assigning, by the index thread manager, a respective index of the indexes defined for the target table; and wherein the number of threads update, in parallel, the indexes defined for the target table when the data page is full.

17. A non-transitory computer-readable medium comprising instructions, which when executed by one or more processors, configure the one or more processors to perform operations comprising:

receiving a request to execute a database command identifying a target table;

identifying a plurality of rows to insert into the target table based in part on the database command;

writing rows, from the plurality of rows, into a data page until the data page is full;

determining, by an index thread manager, a number of threads to use for updating indexes defined for the target table by:

determining a number of available threads for updating the indexes defined for the target table;

allocating a number of the available threads as threads for updating the indexes defined for the target table, wherein the number of the allocated threads is equal to the number of indexes defined for the target table when the number of available threads is equal to or greater than the number of indexes defined for the target table; and for each particular respective thread of the allocated threads, assigning, by the index thread manager, a respective index of the indexes defined for the target table; and upon determining the data page is full, updating, in parallel, the indexes defined for the target table using the number of threads.

* * * * *